(No Model.) 3 Sheets—Sheet 1.
G. D. FOSTER.
APPARATUS FOR LOADING CORN SHOCKS.
No. 562,178. Patented June 16, 1896.
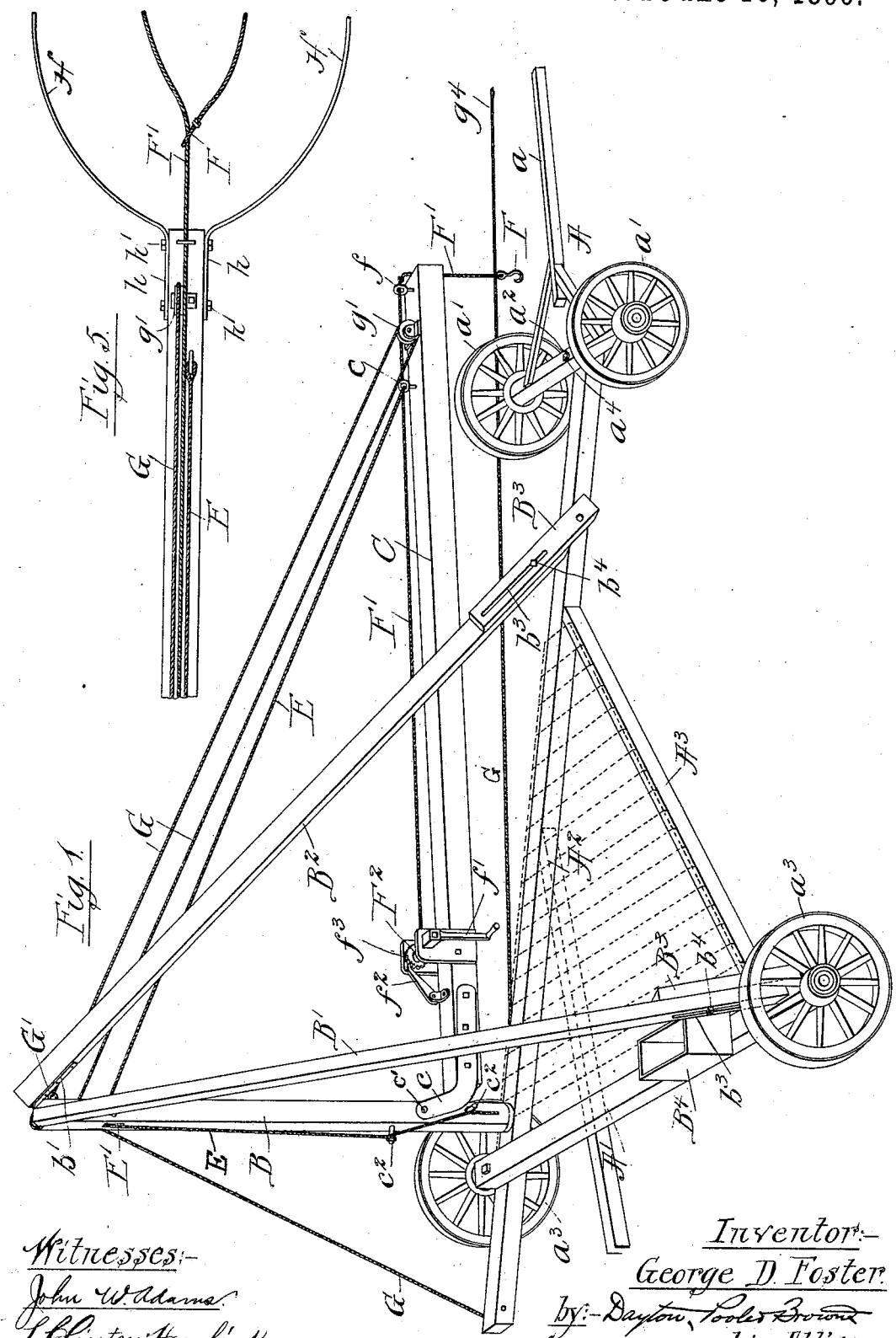
Witnesses:—
John W. Adams
L. Clinton Hamlink
Inventor:—
George D. Foster
by:— Dayton, Pooler & Brown
his Att'ys.

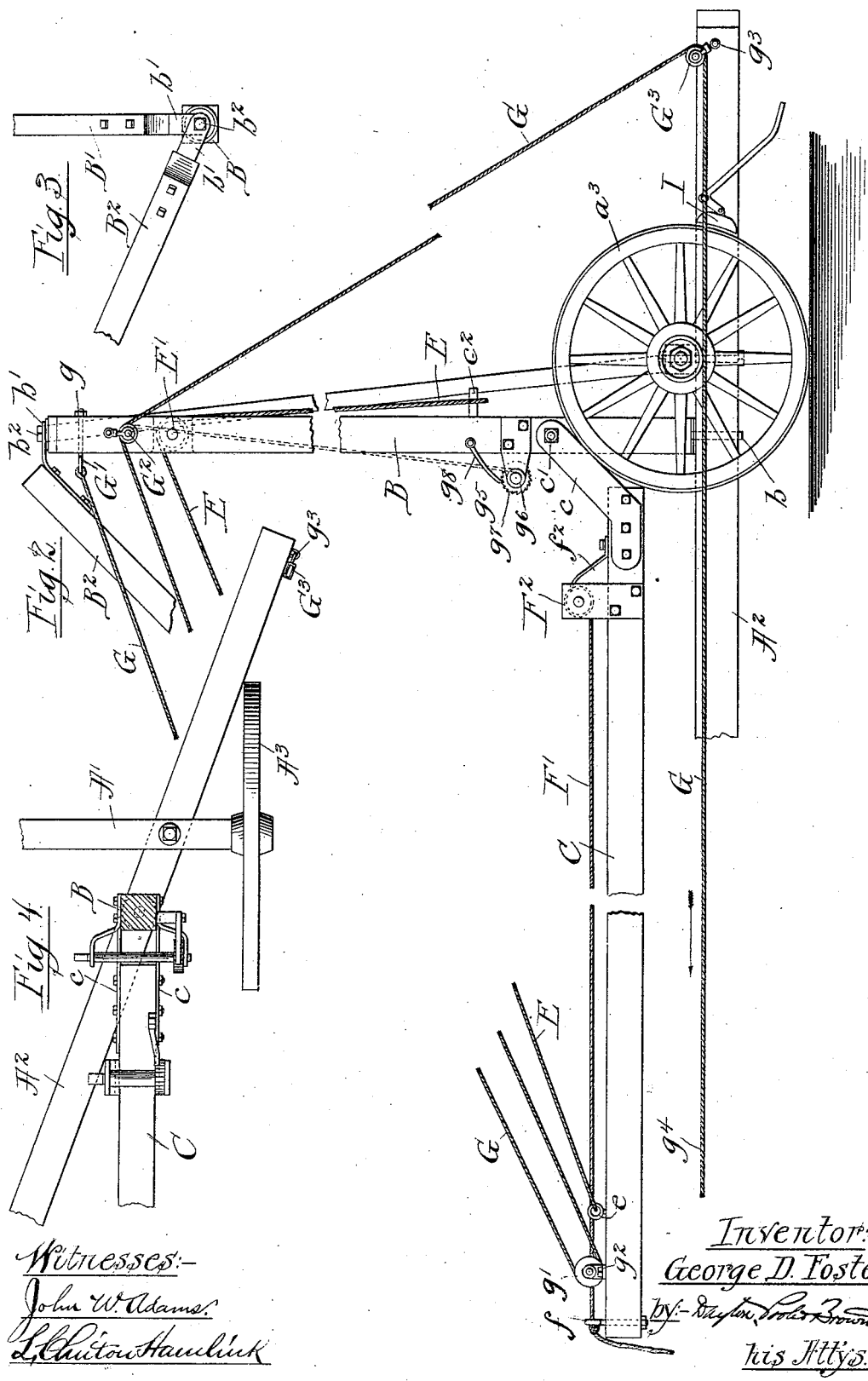

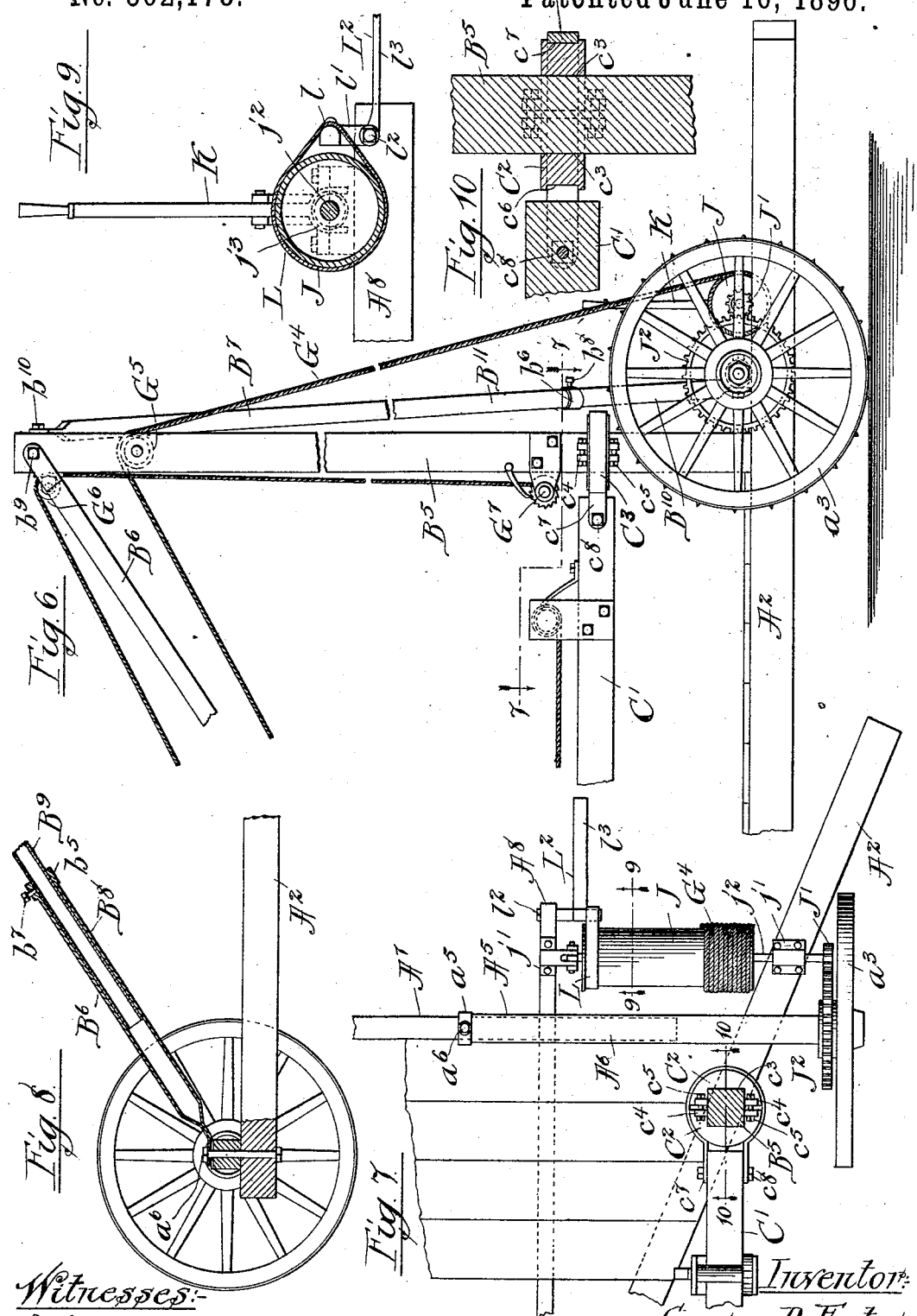

UNITED STATES PATENT OFFICE.

GEORGE D. FOSTER, OF PRESTON, IOWA.

APPARATUS FOR LOADING CORN-SHOCKS.

SPECIFICATION forming part of Letters Patent No. 562,178, dated June 16, 1896.

Application filed February 3, 1896. Serial No. 577,924. (No model.)

*To all whom it may concern:*

Be it known that I, GEORGE D. FOSTER, of Preston, in the county of Jackson and State of Iowa, have invented certain new and useful Improvements in Apparatus for Loading Corn-Shocks; and I do hereby declare that the following is a full, clear, and exact description thereof, reference being had to the accompanying drawings, and to the letters of reference marked thereon, which form a part of this specification.

This invention relates to practical portable devices for raising shocks of corn from their position in the field and depositing them upon a hay-rack or other vehicle, whereby it may be transported to the barn or other convenient point. Corn-shocks are exceedingly bulky and heavy, a shock commonly containing as many as one hundred and twenty hills of corn. It is customary in harvesting a field of corn to space off the field according to the number of hills. Each hill being cut, the stalks are placed in a standing position in the center of a predetermined space, usually ten hills wide and twelve hills long, and all the hills of corn thus brought together forming a shock, and being commonly tied at their tops by binding-twine to prevent the shock from toppling over under the influence of wind and weather.

Heretofore, when it was desired to remove the corn-shocks from the field, the binding-twine passed around the top of the shock has been severed, and then the stalks comprising the shock have been lifted by a fork or hand, two, three, or four at a time, upon the vehicle.

The purpose of this invention is to provide an apparatus whereby the entire shock of corn may be lifted bodily from the ground, whether the shock has been bound together by the binding wire or band or not, and deposit it upon a suitable conveyance.

A further purpose of my invention is to produce an apparatus whereby the hoisting proper may be performed by the aid of horses.

The invention consists in the matters hereinafter described, and more particularly pointed out in the appended claims, and will be more fully understood by reference to the accompanying drawings, in which—

Figure 1 represents in perspective view a device embodying my invention. Fig. 2 is a side view of the same, parts being broken out to reduce the size of the drawing. Fig. 3 is a plan view of the top of the supporting-beam connection and portion of the guide-beams. Fig. 4 is a plan view of a portion of the frame, together with the rear end of the lifting-boom, the supporting-beam being shown in section. Fig. 5 is a plan view of the outer or swinging end of a modification of the boom. Fig. 6 is a side elevation of the rear end of a modified form of the apparatus. Fig. 7 is a horizontal sectional fragmentary view taken on the line 7 7 of Fig. 6 looking downwardly. Fig. 8 is a longitudinal sectional view taken transversely through the front axle and axially of the lower end of the guy connected therewith. Fig. 9 is a sectional view taken on line 9 9 of Fig. 7. Fig. 10 is a central vertical sectional view taken on line 10 10 of Fig. 7.

First describing a construction so designed as to be particularly adapted for construction with the aid of the facilities usually at command in ordinary country towns — that is, without requiring an expensive manufacturing plant.

A represents as a whole a running-gear, the forward member of which may consist of or be of the usual dimensions of the front gear of an ordinary farm-wagon, having a tongue or pole $a$, to which the whiffletrees may be attached, and wheels $a'$ upon the ends of a suitable axle $a^2$.

A' is a rear axle, consisting of a relatively long and heavy piece of timber, at each end of which is a wheel $a^3$. Securely bolted to the under side of the rear axle A', near one end thereof, is a side timber A², its forward end being pivotally secured to the front axle $a^2$ by a king-bolt $a^4$ or other suitable device.

A³ is a second side piece of timber, suitably secured at one end to the opposite end of the rear axle A', and at its forward end to the side timber A², at a point intermediate of the length of the latter.

The three timbers A' A² A³ form an open frame horizontally arranged. Upon this frame is mounted an upright supporting-timber B and suitably-adjustable guy-timbers B' B². The supporting-timber B is vertically arranged and provided at its lower end with a pivotal stud $b$, which enters a suitable aperture in the side timber A² of the frame. The upper end of the support B is steadied and held in position by being engaged with the two guy-timbers B' B², each of which is provided with a metal strap $b'$, which projects beyond the end of the guy-timbers B' B² in a substantially horizontal direction, and through which a suitable pivot-bolt $b^2$ is passed, whereby said straps are pivotally secured to the support B, as more clearly shown in Fig. 3. The lower ends of the guy-timbers B' B² are each adjustably secured to the frame by means of the extension-timbers B³, one of which is secured to the rear axle A' and the other to the side of the timber A², as shown in Fig. 1, and each of which is provided with a longitudinally-arranged elongated slot $b^3$. A suitable bolt $b^4$ passes through said slot $b^3$ and engages the timber B². It being immaterial whether the slot $b^3$ is in the extension B³, or in any guy-timber, I have shown them in both positions in Fig. 1. Of course it will be understood that the slotted guy-timber, as B', may be engaged directly with the frame by having the bolt project from the frame and pass through the slot in said timber. This is such an obvious modification that I do not think it necessary to illustrate it.

B⁴ is a suitable box secured to the rear axle A', or near the point where the side timber A³ is secured thereto. This box may be used for holding any suitable weight, such as stones or the like, when it is desired to give weight to that side of the machine to counterbalance the load being lifted from the other side, as will be hereinafter explained.

The hoisting will be accomplished by means of a swinging boom C, suitably secured to the lower end of the support B. This boom may consist of an ordinary timber, as shown, provided at its rear end with one or more straps $c$, by which it may be pivotally secured, as at $c'$, to the derrick-support B. The position of the outer or swinging end of the boom will be controlled as to its vertical movements by means of a cable E, one end of which is secured to an eyebolt $e$, attached to the outer end of the boom C, and which passes over a friction-pulley E' near the upper end of the support B, and which is snubbed about a pin $c^2$. It is obvious that the position in which the boom is held may be easily determined by removing the cable or rope E from the pin $c^2$, and by shortening or paying the same out as desired, before again snubbing the rope about said pin. It is to be understood, however, that the snubbing-rope E will not ordinarily be used for lifting the boom, special mechanism for accomplishing this purpose being provided, as hereinafter described. It will also be manifest that, by reason of the pivotal connection of the support B, the boom C may be swung laterally from a direction substantially parallel with the line of draft, as shown in Fig. 1, to a direction at right angles thereto.

Upon approaching the shock of corn the hoisting apparatus will be drawn forward until the end of the boom C is in close proximity to said shock. If the shock be bound with wire, or otherwise securely bound, a hook F may be secured to the band of said shock. Otherwise a loop will be used to go about the shock. When the hook is used, it will usually be upon the end of a rope or cable F', which is passed through the eyebolt $f$ upon the end of the boom $c$ and then wound upon a windlass F² upon the rear end of the swinging boom C. The windlass may be operated by a crank-handle $f'$ and a gravity-pawl $f^2$, pivotally secured to the boom, which will act upon the ratchet-teeth $f^3$ of the windlass and prevent the unwinding thereof. Any form of windlass may be used. I have shown, however, a simple and practical mechanism for taking up the slack in the cable or rope F'. When the hook F is secured to the binding wire or cord of the shock, the slack of the cable F' is taken up upon the windlass F². The end of the boom C is then raised in a direction toward the top of the support B until the shock is lifted a sufficient distance from the ground, whereupon the entire boom and the vertical support B is turned upon the supporting-pivot $b$ until the shock is carried vertically above the vehicle upon which it is to be deposited.

The raising of the outer end of the boom C is accomplished by the aid of the following mechanism: One end of a stout cable or rope G is suitably secured to the top or near the top of the support B. The particular manner shown comprises an eyebolt G', passed through the top of the support B and secured by a suitable nut $g$. The cable G is then passed down toward the front end of the boom over and under a friction-pulley $g'$, suitably secured to the outer end of the boom C by means of bolts $g^2$, and is then passed back to the upper end of the support B, where the rope or cable is trained over a pulley-block G², suitably secured to the upper end of said post B. The rope or cable G is then brought down to the rear of the frame and trained under pulley-block G³, suitably secured at $g^3$ to the rear end of the side of the frame-piece A², and is then brought forward in a direction parallel with the line of draft. By lacing the cable G back and forth, as indicated, the leverage is multiplied, the power increased, and it will be comparatively easy for a number of farm-hands to grasp the cable G, and by pulling it in the direction indicated by the arrow in Fig. 2, readily raise the outer end of the boom C and its load, with the corn-shock, to the desired height. As a matter of practice I prefer to secure the outer end $g^4$ of the rope or cable G to part of the wagon or vehicle upon which the fodder or shock is being carried, and thus utilize the team drawing said wagon or vehicle for the purpose of raising the corn-shock, it being understood that the hoisting apparatus and the carrying-vehicle will be drawn forward alternately, the former being first drawn forward and the shock properly connected with the end of the boom, and the vehicle then drawn forward until the boom is sufficiently raised. The snubbing-cable E is now tightened to hold the boom raised and the apparatus drawn forward until it is opposite the vehicle, whereupon the boom and its load are swung over the rack and the shock dropped thereon. I find this is very advantageous, and is an exceedingly practical method of manipulating the apparatus. If, however, it be desired to employ hand-power to elevate the lifting-boom, a windlass $g^5$ may be mounted at some suitable point on the derrick, as, for instance, upon the upright support B, to which the cable G is led directly from the pulley $G^2$, as indicated in dotted lines in Fig. 2. The windlass-shaft $g^6$ is provided with a ratchet $g^7$, which is controlled by a gravity-pawl $g^8$, whereby the boom may be held at any angle of elevation.

A brake I will be provided, arranged to act on one of the wheels, herein shown as consisting of a foot-brake of common construction mounted upon the timber $A^2$ adjacent to the rear side of the wheel $a^3$ and operable by an operator standing on the ground, whereby the apparatus may be held from running forward under the draft on the cable when the boom and its load are being elevated.

Should the corn-shocks be prepared in a manner commonly practiced by farmers, to wit, the corn-hills being simply stacked together and their upper ends held by binding-twine, the shock itself not being bound by a wire or other cable, so that it could not be lifted thereby, I prepare the outer end of the swinging boom C in the manner indicated in Fig. 5. As there shown, the end of the boom is provided with two outwardly-diverging curved metal arms H H, the arms being secured to the boom by means of short extensions $h$, through which pass bolts $h'$. The spread of the arms H H will usually be about three feet and their general direction will be curved in the arc of a circle, of which the two arms form approximately one-half, as shown, so that when the end of the boom is brought up against a shock of corn, the arms H H will partially encircle the shock. I then pass the rope F' about the outside of the shock and bring the end back upon itself to form a loop, engaging the hook F over the rope F'. By then tightening up on the windlass I not only draw up all the slack in the cable or rope F', but bind the shock by the loop formed by the end of the cable or rope F' and the hook F. The lifting of the shock and the swinging of the boom is accomplished as before. In this instance, as before, it will be noted that the end of the cable F' constitutes a temporary binding for the shock, being in use from the time the shock is engaged until the latter is lifted upon the vehicle and the hook disengaged from the cable F'. In some instances it may be desirable to form the end of the cable or rope F' permanently into a slide or loop, dispensing with the hook F, but this of course is an immaterial variation.

In Fig. 1 I have indicated in dotted lines the central part of the triangular main frame A covered with a platform. Such provision is obviously convenient for the operator to stand upon in handling the boom.

I have used the improvement hereinabove described in practical operation in the field, and therefore I am able to state with accuracy that the drawings illustrate, and the foregoing specification describes, a simple, advantageous, and very practical contrivance for accomplishing the purpose specified.

In Figs. 6 to 10, inclusive, I have shown a modified form of my invention in which several additional features of improvement are embodied. As shown in said figures, the general form and arrangement of the main frame is substantially like that hereinbefore described. The longer or rear axle $A^5$ is, however, made of two-part tubular construction, consisting of members $A^6 A^7$, arranged to telescope one within the other, as indicated clearly in Fig. 7, so as to permit the length of the axle to be varied, and secured in adjusted relation to each other by means of a clamping-ring $a^5$ and set-screw $a^6$ in a well-understood manner. The upright support $B^5$ is in this instance mortised in or otherwise immovably secured upon the main frame of the timber $A^2$ and is supported in upright position by means of metal guys $B^6 B^7$, also of tubular construction, and each of which comprises two members $B^8 B^9$ and $B^{10} B^{11}$, respectively, arranged to telescope one upon the other and held in adjustable relation by means of clamping-rings $b^5 b^6$, provided with set-screws $b^7 b^8$. The said guys are each connected with the upright $B^5$ by means of a single bolt $b^9 b^{10}$, respectively, to permit a slight pivotal movement of said parts with relation to each other when the length of the guys is changed. The guy $B^6$ is in this instance shown as extended forwardly to and connected with the top of the front axle by means of the king-bolt $a^6$. The rear end of the boom C' is shown in this instance as connected with the upright $B^5$ by means permitting both lateral-swinging and vertically-pivotal movement, constructed and arranged as follows: $C^2 C^2$ designate two semicircular castings, each provided in its straight side with a rectangular recess $c^3$, adapted to receive one-half of the rectangular upright support $B^5$, so that when said castings are assembled upon opposite sides of the support, as shown most clearly in plan view in Fig. 7, they will form a practically complete exteriorly-circular collar. Each casting is provided with suitably-apertured lugs or ears $c^4$, adapted to receive bolts $c^5 c^5$, whereby said castings may be secured together and clamped immovably upon the said support. The outer periphery of the collar thus formed is provided with an annular groove $c^6$, which is occupied by a strap-iron loop $C^3$, the ends $c^7 c^7$ of which are pivotally connected by means of a transverse pivot-pin $c^8$ with the end of the boom. The loop $C^3$ is so adjusted as to fit and slide easily within the annular groove $c^6$, thus permitting the boom to swing laterally, or rotate, upon the upright support $B^5$, while the transverse pivot-pin $c^8$ provides for vertical oscillatory movement of said boom. The boom-elevating mechanism is in this instance arranged to be operated automatically upon the drawing forward of the apparatus itself. Said mechanism is constructed and arranged as follows: J designates a winding-drum rotatably mounted in suitable bearings $j'$ $j'$, mounted upon the timber $A^2$, and upon a suitable support $A^8$, respectively, and arranged to extend parallel with and a short distance in the rear of the rear axle $A^5$, at a point immediately in rear of the support $B^5$. The shaft $j^2$ of the winding-drum is arranged to extend at its outer end adjacent to the main supporting-wheel $a^3$ and is provided with a pinion J', which is arranged to intermesh with the gear-wheel $J^2$, mounted concentrically upon the inner face of said supporting-wheel $a^3$. The opposite end of the shaft $j^2$ is provided with a fixed collar $j^3$, having a peripherally-annular groove, which is engaged by the forked lower end of a shifting-lever K. (See detail, Fig. 9.) The shaft $j^2$ is made movable endwise within its bearings, and may therefore be shifted by means of said shipping-lever K, so as to throw its pinion J' into or out of mesh with the gear $J^2$. From the winding-drum J a cable $G^4$ is trained to a pulley $G^5$, mounted on the upper part of the upright $B^5$, thence to the pulley $g'$ at the front end of the boom, back again to a third pulley $G^6$, located at the front side of the upper part of the upright $B^5$, and thence down to a windlass $G^7$, constructed and arranged similar to that shown in Fig. 2. Obviously, when thus constructed and arranged the winding-drum J will be rotated and the boom C' automatically raised as the apparatus is drawn forward. In order that the unwinding of the cable from the drum may be controlled so as to regulate the descent of the boom, I provide a brake adapted to act upon the drum J, as shown, in this instance consisting of a band L, arranged to encircle the drum at one end thereof and connected at one side of the latter, as at $l$, with one arm $l'$ of a bell-crank lever $L^2$, pivoted, as at $l^2$, to the side support $A^8$. The other arm $l^3$ of the bell-crank lever is arranged to extend horizontally rearward, and forms a foot-lever, by depressing which tension is brought upon the band, so as to cause it to frictionally engage the winding-drum, and thus enable the operator to regulate the unwinding of the cable from the latter. The operation of this apparatus is substantially the same as that of the apparatus hereinbefore described, excepting that in this case, after the forward end of the boom has been properly engaged with a shock, the apparatus, as a whole, will be drawn forward far enough to elevate the boom to the desired height, whereupon the vehicle upon which the shock is to be deposited will be driven up adjacent thereto, and the shock deposited, as in the former construction.

I claim as my invention—

1. In an apparatus for loading corn-shocks or the like, the combination of a wheeled derrick provided with a swinging boom, mechanism for elevating the free end of the boom, and means for detachably supporting a corn-shock upon the free end of the boom embracing a binding-cable adapted to encircle the shock and bind it to the end of the boom in upright position, substantially as described.

2. In an apparatus for loading corn-shocks or the like, the combination of a wheeled derrick provided with a swinging boom, means for detachably supporting a corn-shock upon the free end thereof, embracing divergent arms mounted upon the end of the boom, and a binding-cable adapted to encircle the shock and bind it to the end of the boom between said arms and means for elevating the free end of the boom comprising a cable-and-pulley power-multiplying mechanism substantially as described.

3. In an apparatus for loading corn-shocks or the like, the combination of a horizontal main frame of generally triangular form, an upright support mounted upon said main frame adjustable guys for holding said support upright, a boom connected at one end to the lower part of the upright support, so as to be capable of both vertical and lateral movement, means for detachably supporting a corn-shock upon the free end of the boom, and a cable-and-pulley mechanism for elevating the free end of the boom, substantially as described.

4. In an apparatus for loading corn-shocks or the like, the combination of a horizontal main frame of generally triangular form, an upright support pivotally mounted upon said main frame so as to rotate upon a vertical axis, guys arranged to extend from the main frame to the upper part of the upright support, a lifting-boom pivotally connected at one end with the lower part of the upright support, means for detachably supporting a corn-shock upon the free end thereof embracing a cable trained through a guide at the outer end of the boom, and a binding device for taking up the slack of the cable and means for elevating the free end of the boom comprising a cable-and-pulley mechanism connected with the outer end of the boom and with the upper part of said upright support, substantially as described.

5. In an apparatus for loading corn-shocks or the like, the combination of a horizontal main frame of generally triangular form, an upright support pivotally mounted upon said main frame, so as to rotate upon a vertical axis, adjustable guys arranged to extend from the main frame to the upper part of the upright support, a lifting-boom pivotally connected with the lower part of the upright support, means for adjustably holding the boom in any desired position comprising a cable connected with the outer end thereof, trained thence over a guide-pulley mounted upon the upper part of the upright support and secured to the lower part of said support, means for detachably supporting a corn-shock upon the free end thereof, embracing a cable trained through a guide at the outer end of the boom and a binding device for taking up the slack of the cable and means for elevating the free end of the boom comprising a cable-and-pulley mechanism connected with the outer end of the boom and with the upper part of said upright support, substantially as described.

6. In an apparatus for loading corn-shocks or the like, the combination of a rear wheeled truck provided with a relatively long axle, the side members connected with each other and with the axle of said rear truck and forming with the latter a horizontally-arranged triangular main frame, the front wheeled truck with which said horizontal main frame has pivotal connection, the upright support pivotally mounted upon the main frame, adjustable guys holding said upright support in a vertical position, the swinging boom pivotally connected with the lower part of the upright support, means for detachably supporting a corn-shock upon the free end of the boom and a cable-and-pulley power-multiplying mechanism for elevating the free end of the boom, substantially as described.

7. In an apparatus for loading corn-shocks or the like, the combination of a rear wheeled truck provided with a relatively long axle made adjustable as to length, the side members connected with each other, and with an axle on said truck and forming with the latter the horizontal triangular main frame, the front wheeled truck with which said horizontal main frame has pivotal connection, the upright support pivotally mounted upon the main frame, adjustable guys holding said upright support in a vertical position, the swinging beam pivotally connected with the lower part of the upright support, means for adjustably supporting a corn-shock upon the free end of the boom, and a cable-and-pulley power-multiplying mechanism for elevating the free end of the boom, substantially as described.

8. An apparatus for loading corn-shocks or the like comprising a derrick provided with a swinging boom, means for detachably supporting a corn-shock upon the free end of said boom comprising divergent arms adapted to embrace the sides of the shock, and a binding-cable connected with the end of the boom and adapted to be passed around the shock to hold it within the space between the arms, substantially as described.

9. An apparatus for loading corn-shocks or the like, comprising a derrick provided with a swinging boom, means for detachably supporting a corn-shock upon the free end of said boom comprising divergent arms adapted to embrace the sides of the shock, a binding-cable connected with the end of the boom and adapted to be formed into a running loop embracing the shock, and suitable mechanism for taking up the slack of the cable and holding the shock between the divergent arms, substantially as described.

10. In an apparatus for loading corn-shocks or the like, the combination of a wheeled main frame, an upright support thereon, guys arranged to extend from the main frame to the upright support, a lifting-boom pivotally connected at one end with the lower part of said upright support so as to permit of both lateral and vertical oscillatory movement of the boom, means for detachably supporting a corn-shock upon the free end of the boom, and means for lifting the boom comprising a cable connected with the part of the boom at a point remote from the pivotal connection of the latter, trained thence to the upper part of the upright support and to a winding mechanism operatively connected with the running-gear of the apparatus.

11. In an apparatus for loading corn-shocks or the like, the combination of a wheeled main frame, an upright support thereon, guys arranged to extend from the main frame to the upright support, a lifting-boom pivotally connected at one end with the lower part of said upright support so as to permit of both lateral and vertical oscillatory movement of the boom, means for detachably supporting a corn-shock upon the free end of the boom, and means for lifting the boom comprising a cable connected with the part of the boom at a point remote from the pivotal connection of the latter, trained thence to the upper part of the upright support to a winding mechanism operatively connected with the running-gear of the apparatus, and means for adjusting the height of the free end of the boom operable independently of the winding mechanism proper.

12. In an apparatus for loading corn-shocks or the like, the combination of a wheeled main frame, an upright support thereon, guys arranged to extend from the main frame to the upright support, a lifting-boom pivotally connected at one end with the lower part of said upright support, so as to permit of both lateral and vertical oscillatory movement of the boom, means for detachably supporting a corn-shock upon the free end of the boom, and means for lifting the boom comprising a cable connected at one end with a windlass mounted upon the frame, trained thence to a guide-pulley mounted upon the boom at a point remote from its point of pivotal connection with the upright, thence to the upper part of the upright support and to a winding mechanism operatively connected with the running-gear of the apparatus.

13. In an apparatus for loading corn-shocks or the like, the combination of a wheeled main frame, an upright support thereon, guys arranged to extend from the main frame to the upright support, a lifting-boom pivotally connected at one end with the lower part of said upright support so as to permit of both lateral and vertical oscillatory movement of the boom, means for detachably supporting a corn-shock upon the free end of the boom, means for lifting the boom comprising a cable connected with the part of the boom at a point remote from the pivotal connection of the latter, trained thence to the upper part of the upright support and to a winding mechanism operatively connected with the running-gear of the apparatus, means for shifting said winding mechanism into and out of gear with the running-gear of the apparatus, and a brake changed to act on the winding-drum thereof.

In testimony that I claim the foregoing as my invention I affix my signature, in presence of two witnesses, this 29th day of January, A. D. 1896.

GEORGE D. FOSTER.

Witnesses:
ALBERT H. GRAVES,
WILLIAM L. HALL.